May 14, 1940.  J. D. STRONG ET AL  2,200,646
TRANSPARENT PROJECTION SCREEN
Filed Feb. 28, 1938  3 Sheets-Sheet 1

Inventors
John D. Strong,
Roger Hayward.
Attorney

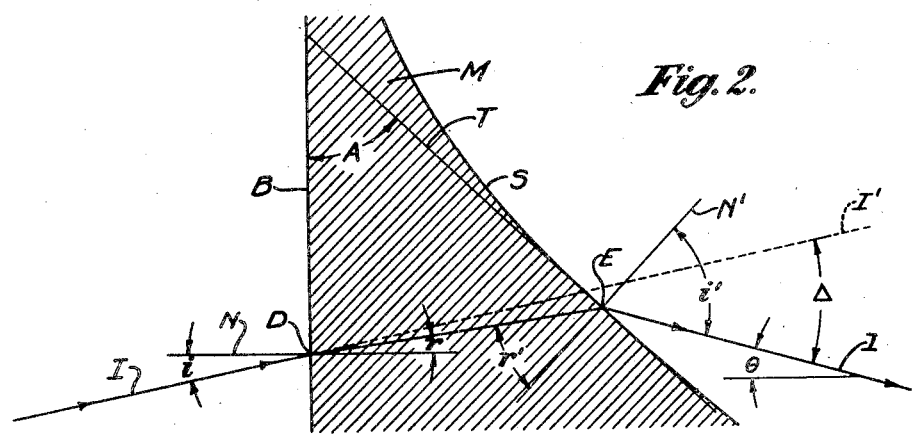
Fig. 2.
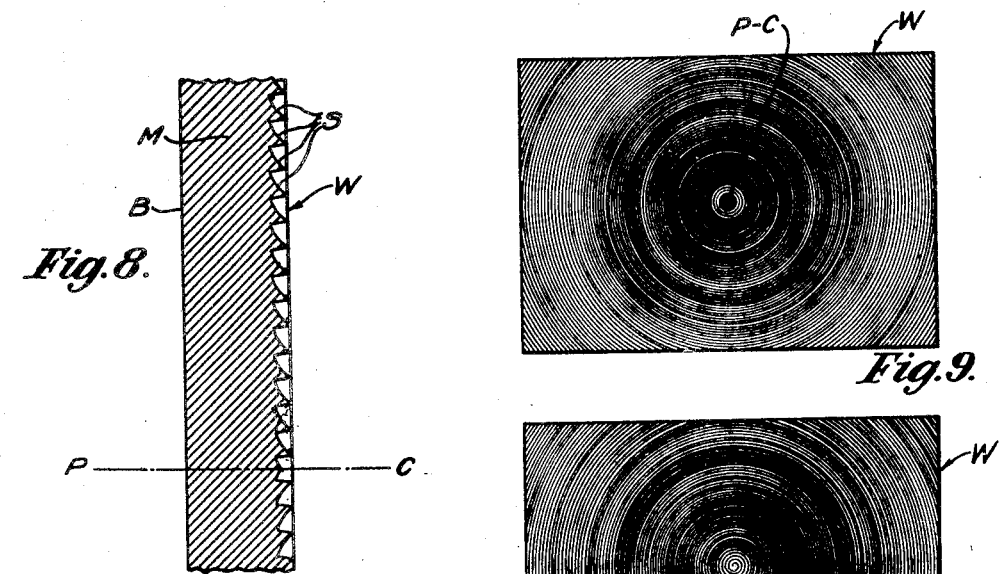
Fig. 8.
Fig. 9.
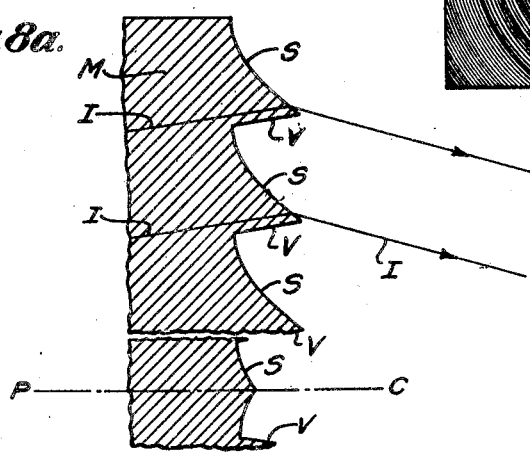
Fig. 8a.
Fig. 9a.
Inventors
John D. Strong,
Roger Hayward.
Attorney.

Inventors
John D. Strong.
Roger Hayward.

Attorney.

Patented May 14, 1940

2,200,646

UNITED STATES PATENT OFFICE 2,200,646

TRANSPARENT PROJECTION SCREEN

John D. Strong and Roger Hayward, Pasadena, Calif.

Application February 28, 1938, Serial No. 193,057

4 Claims. (Cl. 88—24)

This invention relates generally to transparent projection screens of the type employed in the background projection process of composite motion picture photography.

In the background projection process, a translucent projection screen of suitable size is erected, and a projector projects the background scene onto the screen from the rear. The action or other foreground component is positioned in front of the background screen, and the camera, located at a suitable position in front of the screen, photographs the action and background scene simultaneously.

The invention is utilizable in any projection system where the screen is "viewed," either by eye or by a camera, from the side opposite the projector. The camera or camera entrance pupil of the following specific description may be considered more broadly as the viewing point; and the projector-camera axis may be considered more broadly as the projector-viewing axis. For the purposes of description it will suffice to treat of the screen as being viewed and photographed by a camera.

Among the problems encountered in the practice of the background projection process is the obtainment of, first, sufficient total effective illumination of the screen, and second, comparatively uniform illumination over the entire area of the screen, particularly as viewed from the camera. As the process is normally set up, the projector and camera are located on a central axis perpendicular to the screen. Other locations are used, but the foregoing is typical. Adjacent to this axis the effective screen illumination is very high, producing a central "hot spot"; but the intensity of illumination falls off rapidly as the distance from that axis increases, and with a typical dispersive cellulose acetate screen of sizes now in use and involving the ordinarily used projector and camera angles, the effective illumination at the center, i. e., along the axis, may be at least four or five times that at the edge. Even with a projection screen of comparatively small size, e. g., eighteen or twenty feet in width, there results this much fall of illumination at the edge; and if the attempt is made to use a "wide" screen, say forty or fifty feet in width with a corresponding increase in camera and projector angles, the illumination at the edge dwindles substantially to nothing.

It is a primary purpose of the present invention to provide a background projection screen which, from the point of view of a camera located on a projector-camera axis, will have comparatively high and substantially uniform intensity of illumination over its entire area, even when made up in comparatively large size and involving camera and projector angles much larger than now used. The distance of the camera from the screen along the projector-camera axis varies for different shots, and it is therefore a further object of the invention to provide a screen which will enable the camera to be located at various positions along this axis, in any one of which the illumination of the entire screen, as seen by the camera, is both high and uniform.

In accordance with the present invention, one side of the projection screen, preferably the side facing the camera, is formed with a multiplicity of identical refractive formations arranged either in concentric circles or in a spiral about the central optical axis of the system. The refractive formations may be referred to as grooves, as they are preferably continuous. The profile of the grooves, as seen in a plane passing through the optical axis of the system, is such that when the screen is illuminated by a projector located on the central optical axis, substantially equal quantities of light are refracted by the various refractive formations at such angles as to reach the optical axis and the entrance pupil of the camera, regardless of the fact that the grooves are all at different distances from the optical axis. In other words, while the refractive surface or formation defining each groove of the screen has a different total of projector light incident thereon, and also refracts light at various, but limited, non-useful angles as well as at an angle proper to reach the camera, the profile of the grooves is such that each of the grooves delivers substantially the same quantity of light at an angle proper to reach the camera from the position of that groove on the screen. Moreover, this relation holds true for the entire range of useful camera positions along the optical axis. The effective illumination of the entire area of the screen is accordingly substantially uniform from the viewpoint of the camera for any usual or normal camera position along the axis of the system.

The invention will be best understood by now referring to the accompanying drawings illustrative thereof, and in which:

Figs. 1 and 2 are diagrams illustrative of the determination of an equation definitive of the shape or form of the refractive formations of the screen;

Fig. 8 is a fragmentary section of a multiple grooved or refractive formation screen in accordance with the present invention, utilizing the concave curve of Fig. 6;

Fig. 8a is a fragmentary enlargement of a portion of Fig. 8;

Fig. 9 shows a diagrammatic face view of the screen of Fig. 8; and

Fig. 9a shows a diagrammatic face view of a variant arrangement of grooves about the optical axis.

The multiple refractive formations of the present invention may, within the broad scope of the invention, be formed by grooving either side of the screen, though it is advantageous to place the formations on the side facing the camera, in that direct reflections from lighting of the set or "action" are broken up by these formations when so placed. The invention will accordingly be principally described herein in the form in which the multiple refractive formations appear on the camera side of the screen, though without limitation thereto.

Figure 1:
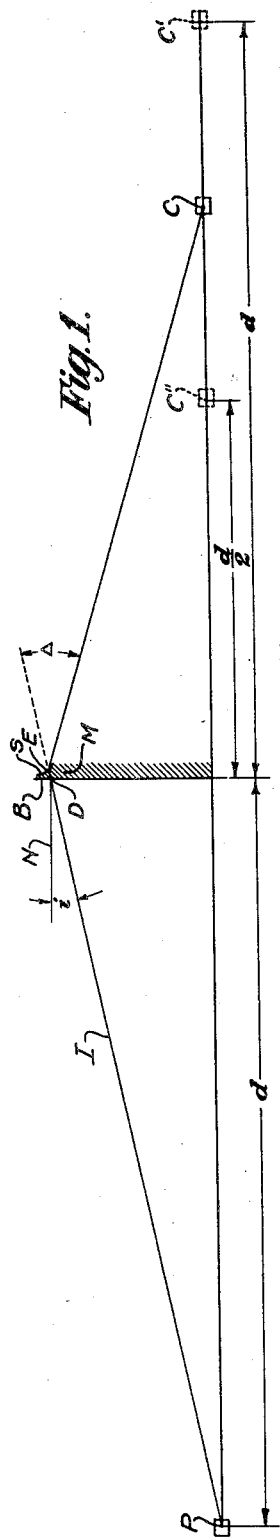

Reference is first directed to the diagrams of Figs. 1 and 2, which are illustrative of the determination of the curvature of the refractive formations on the screen. PC is the projector-camera or projector-viewing optical axis of the system, and B denotes the plane rear face of the refractive medium M on which the refractive grooving is to be formed, medium M being of any suitable transparent screen material as cellulose acetate, and surface B being at right angles to axis PC. I is a ray of light coming from the projector at P, at a given angle $i$ to the central optical axis, and incident on surface B at D, at angle of incidence $i$ with normal N.

This ray is refracted so as to make angle $r$ with normal N, and intersects forward screen surface S at E, making an angle $r'$ with the normal N' to the latter surface. The ray must be so refracted by surface S (the surface to be determined), as to intersect optical axis PC at the location C of the lens of the camera. T is the tangent to surface S at point E, and A is the angle between the tangent to said curve and the vertical plane B. The ray I, emerging through surface S, makes the angle $i'$ with normal N'. It will be evident from the construction that the angle of incidence $i$ of ray I incident on surface B is equal to the angle between ray I and the optical axis PC of the system. The angle between the prolongation I' of incident ray I, and the ray I after refraction, is the total deviation angle and is marked $\Delta$ in Figs. 1 and 2. The angle between ray I after deflection and the optical axis of the system is marked $\theta$.

From the construction of Figs. 1 and 2, we have:

$$A + \Delta = i + i' \quad (1)$$

The term $i'$ in Equation 1 may be written in terms of A and $i$. Also, $\Delta$ in Equation 1 may be written in terms of $i$ and a factor $k$, which varies for different positions of the camera along the optical axis.

Thus, assuming the refractive index $n$ of medium M to be 1.5, $$i' = \arc\sin \frac{3}{2} \sin\left\{A - \left(\frac{2}{3}i - \frac{5}{81}i^3\right)\right\} \quad (2)$$

giving the relation existing between A, $i$ and $i'$ to close approximation.

Assuming a projector distance from the screen equal to $d$, and an arbitrary range of camera distances from the screen between $$d \text{ and } \frac{d}{2}$$

then, when the camera is at $d$ (position C'), $\Delta = 2i$, and when the camera is at $$\frac{d}{2}$$

(position C''), it may be shown that, to close approximation, $\Delta = 3i - 2i^3$. The last term of this expression is insignificant and may be omitted.

Accordingly, $\Delta$ may be set to equal $(k+1)i$, where $k$ has a value of 1 for camera position $d$, and gradually increases to a value of 2 for a camera position approaching $$\frac{d}{2}$$

The factor $k$ is thus a convenient term for establishing the position of the camera between $$d \text{ and } \frac{d}{2}$$

Now, substituting expressions derived for $\Delta$ and $i'$ in Equation 1 and simplifying, there results $$\cot A = \frac{1 + \left[k^2 - \frac{2}{3} + \frac{1+k^2}{6(1+k)}\right]i^2 + \left[\frac{10}{81} - \frac{k^4}{12} - \frac{k^5}{120(k+1)} + \left(k^2 - \frac{2}{3}\right)\frac{1+k^3}{6(1+k)}\right]i^4}{2(k+1)i} \quad (3)$$

This Equation 3, which, though not absolutely accurate, yet holds to the degree of accuracy required when angle $i$ does not exceed approximately 14°, may now be employed to determine the angle A of an element of the refractive surface S necessary to refract a beam of light I of any angle of incidence $i$ within 14°, i. e., any angle within 14° with reference to optical axis PC, so as to intersect the optical axis at C, the position of the lens of the camera. Thus the appropriate value of $k$ for a given camera position is substituted in Equation 3, and for each value of $i$, the corresponding angle A may then be readily calculated. Equation 3 is thus an expression enabling calculation of the angle A necessary to refract a ray of given angle of incidence $i$ to a given camera position.

In practice, the distance of the camera from the screen is usually between the distance of the projector from the screen and about half the distance of the projector from the screen. This is of course no limitation on the process or on the present invention, though it may be taken as a basis for illustrative calculation. A screen determined on the basis of those arbitrarily taken camera distances is also suitable for a limited range of camera positions outside those points. The shape of the curved profile of S is formally determined for a value of $k$ equal to 1, as follows.

The angles A for a series or light rays of different angles of incidence $i$ are first calculated by use of Equation 3, the incident rays chosen for calculation being separated by equal angles. The results of such a calculation for six typical equally separated rays L1 to L6 radiating from P are portrayed in Fig. 3, where F, G, H, I, J and K are lines drawn at the calculated angles A for light rays L1 to L6. These lines represent facets of different angularities A such as will refract the rays L1 to L6 through angles proper to bring them to the point C' as determined by the value $k=1$. Thus a screen having refractive facets defined by lines such as F, G, H, I, J, K, etc., provided sufficient facets are taken, will refract rays of all angles of incidence $i$ to the camera (within the assumed limits of the calculation, i. e., the maximum angle $i$ no greater than substantially 14°).

Now, if the light intensity over the total area of the screen is to be substantially constant, as viewed from the position of the camera, the quantity of light refracted by facets F, G, H, I, J, K, etc., must be substantially constant. This is accomplished in accordance with the present invention by making the facet profiles of different lengths, in such manner as to compensate for differences in reflection losses and also to compensate for foreshortening. Such reflection and foreshortening losses may be calculated and the lengths of the facets ordered accordingly. The lengths of the facets may be arbitrarily assigned, however, by a simple rule which approximates the calculated values. This rule is that the horizontal projection (see $p$ in Fig. 3) of the facets on the rear face B of the screen shall be constant, and the lengths of successive facets are so determined in Fig. 3. The variations of light intensity introduced by the failure of this rule to give the correct facet lengths are continuously progressive and amount to only a few percent. Accordingly, the approximation involved in using this rule is close enough for photography.

Figure 3:
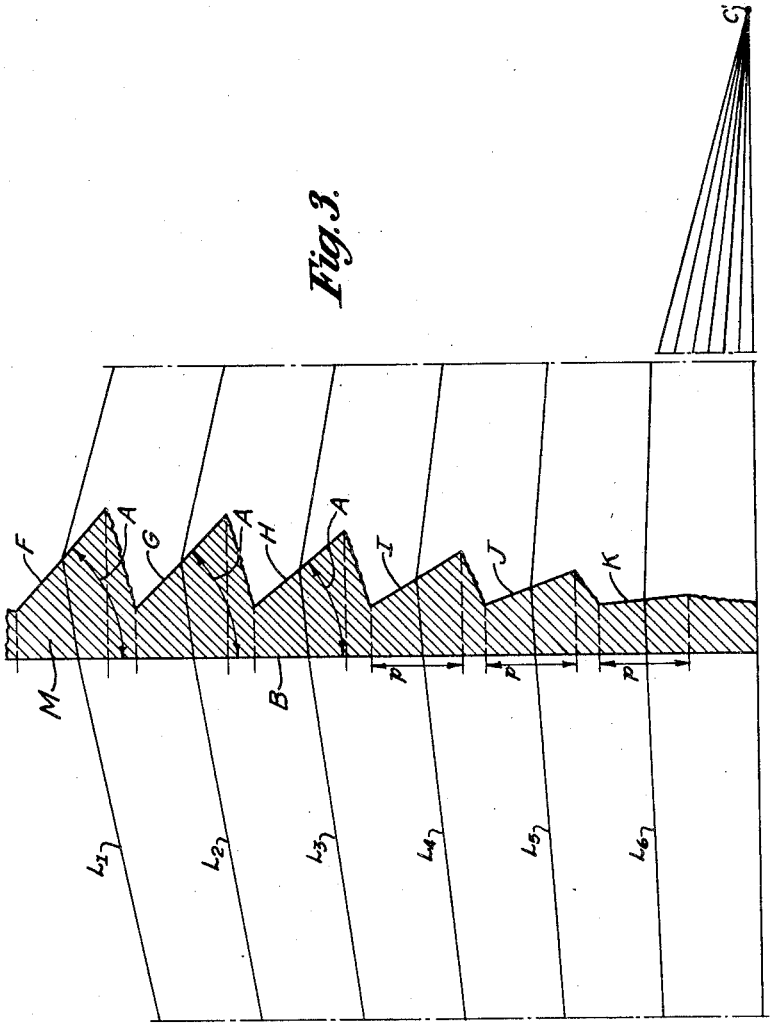
Fig. 3 is a diagram illustrating a further step in the determination of the screen formations, and showing a screen having straight sided facets of angularities and lengths such as will meet the requirements of the present problem.
Figure 4:
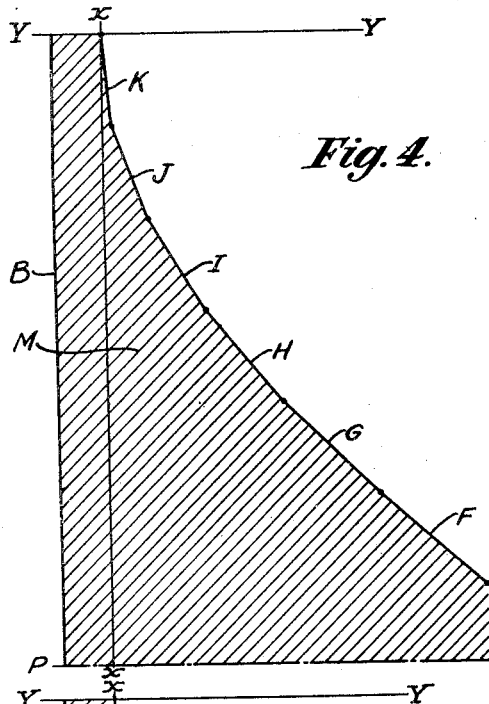
Figs. 4 and 5 are diagrams showing the facets of Fig. 3 assembled in two different manners.
Figure 5:
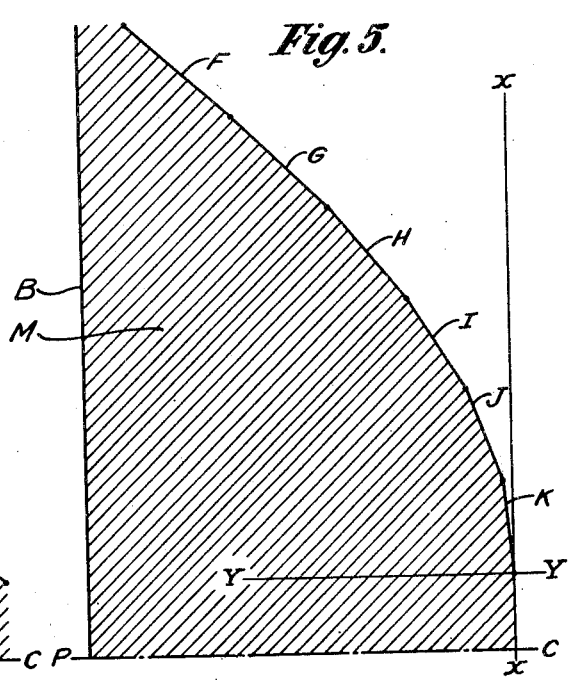
Figure 6:
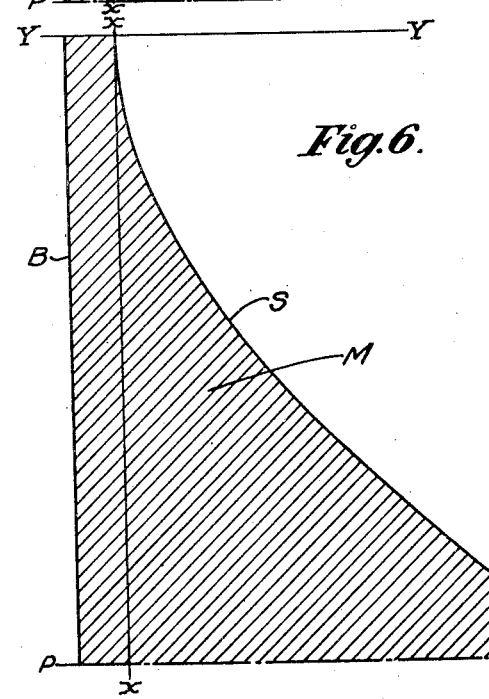
Figs. 6 and 7 show smooth curves determined by the assembled facet arrangements of Figs. 4 and 5, respectively.
Figure 7:
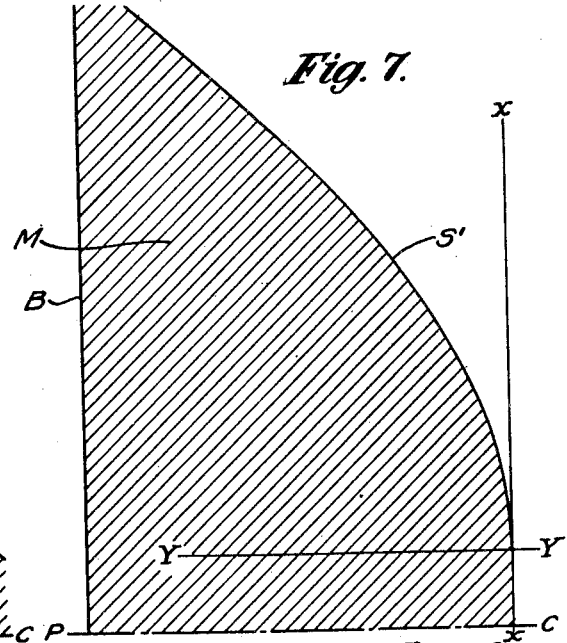

The formal procedure for determining the curved profile S consists in assembling the facets F, G, H, I, J, K, etc., edge to edge, either as indicated in Fig. 4, or as indicated in Fig. 5. In Fig. 5, the facets are in the same order as in Fig. 3, while in Fig. 4 their order is reversed. The profile S of the final refractive formation is then fixed by drawing a smooth curve tangent to facets F, G, H, etc. Thus, curve S in Fig. 6 is the final curved profile determined by the facet arrangement of Fig. 4, and curve S' in Fig. 7 is the final curved profile determined by the facet arrangement of Fig. 5. The accuracy of curves S and S' of course depends upon the number of facets taken. It will become evident as the description proceeds that the two profiles S and S' are interchangeable on the final screen.

The curved profile S or S', the shape of which has been determined as now described, is next reduced to very small scale and repeated as a refractive formation, say twenty to the inch, across the face of the screen, generally denoted by the letter W (Fig. 8). Now it will be evident that the surface S (or S') of each of these minute repeated formations, which are all identical, has one incremental portion or facet of angularity proper for refraction of projector light incident thereon through the necessary angle to bring it to the camera located on the optical axis of the system. Light from the projector refracted by other portions of profile S is of course delivered at other angles and is lost. But there is one incremental portion or facet on the surface S of each of the minute refractive formations which will refract incident projector light at such an angle as to reach the camera lens, the location of this incremental length or facet along the surface S of any given refractive formation depending on the distance of that formation from the central optical axis of the screen. Further, the light deviated to the camera lens by the individual refractive formations is substantially a constant, and therefore the light arriving at the camera from any given formation is independent of the distance of that formation from the optical axis of the system. This follows from the previously described compensation made for reflection loss differences and foreshortening in assigning lengths to successive increments (facets) of surface S during its determination. Accordingly, the light deviated by the various repeated refractive surfaces or formations S at such angles as to reach the camera on the optical axis is substantially a constant, so that the illumination of the screen from the point of view of the camera is substantially constant over its entire area.

The equation for the approximation curve or profile S (or S') which, as will be recalled, was determined by assigning lengths to successive facets such that their horizontal projections are equal, is readily derived from Equation 3. The slope of this curve is $$\tan A = \frac{dy}{dx}$$

taking X and Y axes through the upper end of the curve of Fig. 6, for example. In all cases as here illustrated the Y axis is parallel to the optical axis of the system.

The X coordinate of the profile S, referring back to its generic origin in Fig. 3, is associated with the angle of incidence $i$. In view of the rule already accepted for correcting foreshortening and reflection losses whereby the projections of the facets of Fig. 3 on the surface B were established as equal we may let $i=x$ in Equation 3.

Then from Equation 3

$$\frac{dy}{dx} = \frac{1}{\cot A} = \frac{ax}{1+bx^2+cx^4} \quad (4)$$

where $$a = 2(k+1), \quad b = \left[k^2 - \frac{2}{3} + \frac{1+k^3}{6(1+k)}\right]$$

and $$c = \left\{\frac{10}{81} - \frac{k^4}{12} - \frac{k^5}{120(k+1)} + \left[k^2 - \frac{2}{3}\right]\frac{1+k^3}{6(1+k)}\right\}$$

Taking derivative of Equation 4, the second derivative of $y$, at $x=0$, is $$\frac{d^2y}{dx^2} = a$$

Since $$\frac{d^2y}{dx^2}$$

is equal to the curvature $$\frac{1}{R}$$

of curve S at $x=0$, the radius of curvature R, is equal to $$\frac{1}{a}$$

or $$\frac{1}{2(k+1)}$$

Integrating Equation 4 and substituting R for $$\frac{1}{a}$$

there results, as the algebraic equation for curve S, $$y = \frac{x^2}{2R} - \frac{bx^4}{4R} - \frac{(c-b^2)x^6}{6R} \quad (5)$$

The extent of the profile used should be such that its maximum angularity should be sufficient for refracting the light from the extreme corners of the screen to the nearest useful camera location.

The equation for a parabola osculating this curve at $x=0$ is $$y = \frac{x^2}{2R}$$

It will be evident that the curve determined by Equation 5 is, in first approximation, a parabola symmetrical to the Y axis, differing from a parabola only by the higher order terms $$\frac{bx^4}{4R} + \frac{(c-b^2)x^6}{6R}$$

A hyperbola fits the curve given by Equation 5 better than a parabola. And further, the difference between the shape of the hyperbola which approximates the profile of S for $k=1$ and the hyperbola which approximates the profile of S for $k=2$ is small. For example, for $k=1$ an hyperbola of eccentricity 1.03 approximates closely the curve given by Equation 5. In $k=2$, the close approximation is an hyperbola of eccentricity 1.09. Consequently an average eccentricity of 1.06 suffices for all the stated camera positions. (These figures are, as stated, given for a screen material of refractive index 1.5.) Within the limits of accuracy called for, the curves for all assumed values of $k$ may be considered as having the same shape. The same profile S therefore serves for the repeated refractive formations for all assumed values of $k$, and therefore for all camera positions on the optical axis between $d$ and $$\frac{d}{2}$$

The only limitations on the scale of the refractive formations are, on the one hand, that they should be below the limits of resolution of the camera lens, and on the other hand, that they should be sufficiently large to be capable of accurate formation by whatever manufacturing process is adopted.

The multiple grooved screen of the present invention accordingly provides constant illumination over its entire area from the view-point of the camera on the optical axis. Further, the illumination of the entire screen is uniform for different positions of the camera along the optical axis. Of course, assuming a fixed projector light, the total light reaching the camera is different for different positions of the camera along the axis, but for any camera position, the illumination of the entire screen from the view-point of the camera is substantially uniform.

The shape or profile S of the multiple refractive grooves or formations has now been determined in a plane intersecting the central optical axis of the system. In a practical screen, the multiple repeated formations are symmetrically arranged about the projector-viewing axis, preferably substantially in circles, concentric with said axis, for example, as indicated in Fig. 9, or may be in the nature of a spiral, Fig. 9a. The latter formation may be preferable for reasons of manufacture, especially if formed by a cutting tool. And a multi-polygonal formation approximating circular is also practicable, and may be preferable for making up such a screen as a mosaic.

Figure 8B:
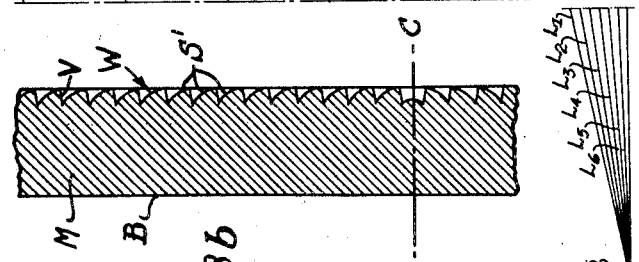
Fig. 8b is a fragmentary section similar to Fig. 8 but showing the use of the convex curve of Fig. 7.

It will be evident that the multiple repeated formations or grooves may be disposed in either the arrangement of Figs. 6 and 8, or as in Figs. 7 and 8b, both curves being generated by a summation of the same incremental facets, and being in all respects identical, save only for the order of assembly of the facets. The arrangement of Fig. 6 may be preferred simply for the reason that it may be most easily produced in practice by use of a cutting tool.

In order to utilize the full width of each refractive surface of profile S, successive refractive surfaces are joined by cut-off surfaces V as indicated in the fragmentary enlarged detail of Fig. 8a, and also in Fig. 8b. These cut-off surfaces V are preferably of at least such angularity as to be parallel with the most angular rays I near the outer edge of the screen; otherwise, for instance if surfaces V were parallel to axis PC, there would be no path in the refracting medium provided for rays (such as I in Fig. 8a) intended to emerge from the edge portions of the refractive surfaces, as will be clearly evident from inspection of Fig. 8a. The edge portions of surfaces S just referred to are those furthest to the right in Fig. 8a.

The profile of the ideal refractive formation is defined with comparatively close accuracy by the equations given above. The required shape of the formation may also be considered and generically defined in the following manner. It is to be recalled that successive infinitesimal facets of the final curve are made of increasing lengths, in accordance with a rule that takes into account and compensates for reflection losses and foreshortening. But, while a curve accurately following the equations as given probably approximates the ideal condition as nearly as it is possible to accomplish, there is a certain range of curves departing somewhat from the derived equations which may satisfy the requirements of a practical screen in given instances. Thus, the derived equations have been shown to define, in first approximation, a parabola, though being fitted even more closely by a hyperbolic curve. But a curve approximating a limited segment of an ellipse, for example, may be used with little loss of uniformity of light distribution, and a screen having multiple refractive formations defined by segments of an ellipse has proved on test to yield a high degree of uniformity of light distribution from the point of view of the camera. The wider the screen, of course, the closer should the curve follow the derived equations; but especially for screens of present standard width, a certain leeway is permissible.

As stated previously, it is of advantage to place the refractive formations on the camera side rather than the projector side of the screen in order to break up light reflections from the front surface of the screen, and the mathematical development given above is accordingly premised on use of the refractive formations in that manner. However, by a similar process the equations for refractive formations on the projector side of the screen may be developed, and by such process it may be shown that the profile of the individual formations when placed on the projector side of the screen is in close approximation, a parabola. Thus, though it is preferred to place the formations on the camera side of the screen, it is also feasible and within the scope of the invention to place the formations on the projector side of the screen.

The derived differential equation for the curvature of the refractive formations on the rearward face of the screen is, $$\frac{dy}{dx} = 2(1+k)x\left[1 - \left\{\frac{1}{6}\left(\frac{1+k^3}{1+k}\right) + \frac{1}{3}(2k^2-3)\right\}x^2\right] \quad (6)$$

where $x$, $y$ and $k$ have the same significance as in the case of the formations on the front face of the screen.

The algebraic equation for the curvature of the rear face formations is $$y = \frac{x^2}{2R} - \frac{\left\{\frac{1}{6}\left(\frac{1+k^3}{1+k}\right) + \frac{1}{3}(2k^2-3)\right\}x^4}{4R} \quad (7)$$

where $$\frac{1}{R} = \frac{d^2y}{dx^2} = 2(1+k)$$

R being the radius of curvature at $x=0$. Since $$y = \frac{x^2}{2R}$$

is the equation for a parabola, the curve defined by Equation 7 differs from a parabola by the higher order term $$\frac{\left\{\frac{1}{6}\left(\frac{1+k^3}{1+k}\right) + \frac{1}{3}(2k^2-3)\right\}x^4}{4R}$$

and is therefore, in first and sufficiently close approximation, a parabola. The calculated curve eccentricity for $k=1$ is 0.99; for $k=2$ is 1.056. The average is an eccentricity of unity which indicates the parabola. These figures are also given for a refractive index of 1.5. That an elliptical curvature will suit some situations quite accurately is shown by the elliptical eccentricity just mentioned—0.99.

It will be recalled that with the screen having front face grooving, the profile of the refractive formations may be used in two dispositions, one the reverse, top-for-bottom as well as right-for-left, of the other (Figs. 6 and 7). For like reasons, the profile shape for rear face grooving may also be used in two dispositions, one the top-for-bottom and right-for-left reverse of the other, with similar effect. The dispositions of the two profile curves for the rear face may be visualized by simply, in Figs. 6 and 7, putting the projector at the right and the camera at the left.

It may be stated that, in general, the profiles will be different for materials with an index of refraction greater or smaller than 1.5. The equations describing the profiles will in all cases have the same form as the ones developed here with an index of 1.5, differing only in the numerical value of the coefficients.

We claim:

1. A transmissive optical element adapted to receive light from a substantially point source at the rear and to be viewed from the front along an optical axis passing substantially through the source and viewing point, said optical element having two substantially parallel faces, and having on one face a multiplicity of separated refractive formations grouped symmetrically and substantially concentrically about the optical axis, said formations being identic, and each said formation being in the form of a recess having a wall at the recess side further from the optical axis, which said wall is substantially parallel to a ray of light passing near it through the medium of the optical element, and having a transparent wall surface at the recess side nearer the optical axis, which said wall surface is curved in a plane determined by the optical axis, said surface having a varying radius of curvature, said radius of curvature increasing with increasing angularity of the wall surface to the face of the optical element.

2. A transmissive optical element adapted to receive light from a substantially point source at the rear and to be viewed from the front along an optical axis passing substantially through the source and viewing point, said optical element having two substantially parallel faces, and having on one face a multiplicity of separated refractive formations grouped symmetrically and substantially concentrically about the optical axis, said formations being identic, and each said formation being in the form of a recess having a wall at the recess side further from the optical axis, which said wall is substantially parallel to a ray of light passing near it through the medium of the optical element, and having a transparent wall surface at the recess side nearer the optical axis, which said wall surface is curved in a plane determined by the optical axis, said surface having a varying radius of curvature, said radius of curvature increasing with increasing angularity of the wall surface to the face of the otical element, and said wall surface being concave.

3. A transmissive optical element adapted to receive light from a substantially point source at the rear and to be viewed from the front along an optical axis passing substantially through the source and viewing point, said optical element having two substantially parallel faces, and having on one face a multiplicity of separated refractive formations grouped symmetrically and substantially concentrically about the optical axis, said formations being identic, and each said formation being in the form of a recess having a wall at the recess side further from the optical axis, which said wall is substantially parallel to a ray of light passing near it through the medium of the optical element, and having a transparent wall surface at the recess side nearer the optical axis, which said wall surface is curved in a plane determined by the optical axis, said surface having a varying radius of curvature, said radius of curvature increasing with increasing angularity of the wall surface to the face of the optical element, and said wall surface being convex.

4. A transmissive optical element adapted to receive light from a source at the rear and to be viewed from the front along an optical axis passing substantially through the source and viewing point, said optical element having two substantially parallel faces, and having on one face a multiplicity of separated refractive formations grouped symmetrically and substantially concentrically about the optical axis, said formations being identic, and each said formation being in the form of a recess having a wall at the recess side further from the optical axis, which said wall is substantially parallel to a ray of light passing near it through the medium of the optical element at a point in the optical element where the ray passing through the medium makes substantially the largest angle with the optical axis, and having a wall surface at the recess side nearer the optical axis, which said wall surface is curved in a plane determined by the optical axis, said surface having a varying radius of curvature, said radius of curvature increasing with increasing angularity of the wall surface to the face of the optical element.

JOHN D. STRONG.
ROGER HAYWARD.